Nov. 27, 1956   S. HAMMER   2,771,627
RECESSED HANDLE FOR DRAWERS, DOORS, AND THE LIKE
Filed April 15, 1953
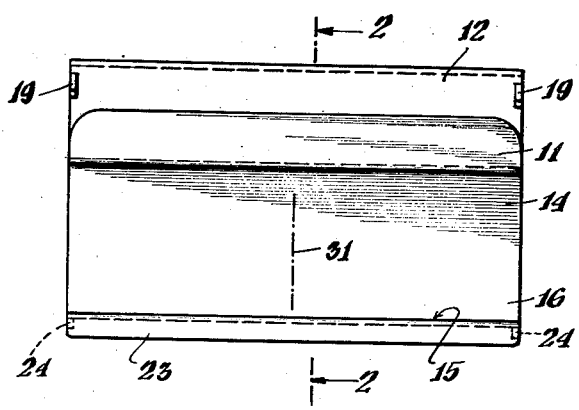
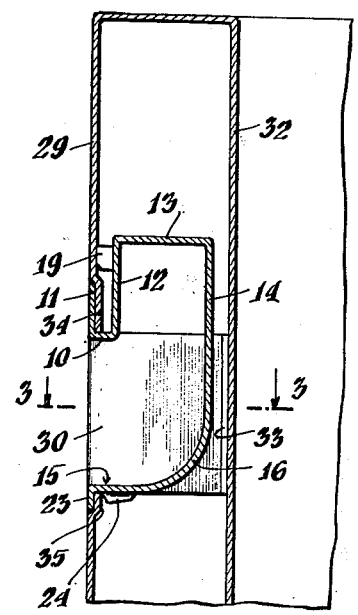
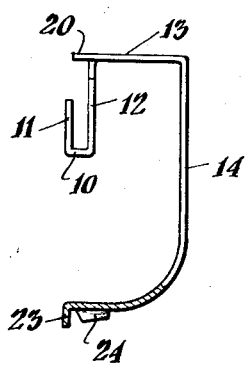
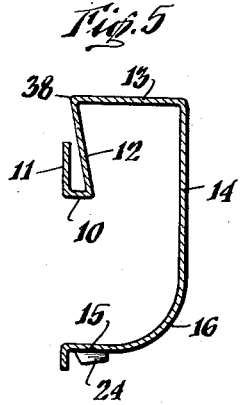
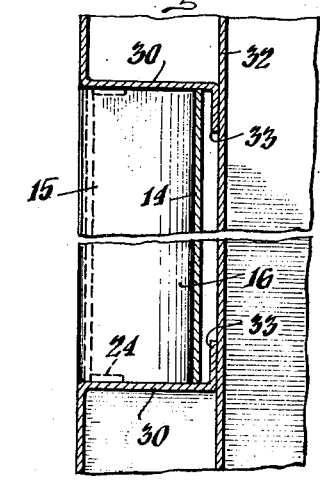
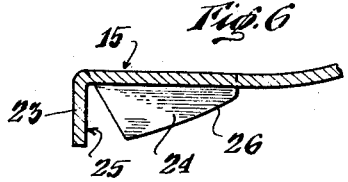
INVENTOR.
Samuel Hammer
BY
Bohleber, Jasetts Montstream
ATTORNEYS

United States Patent Office 2,771,627
Patented Nov. 27, 1956

2,771,627

RECESSED HANDLE FOR DRAWERS, DOORS, AND THE LIKE

Samuel Hammer, New York, N. Y., assignor to United Metal Box Co., Inc., Brooklyn, N. Y., a corporation of New York Application April 15, 1953, Serial No. 348,898

6 Claims. (Cl. 16—124)

A recessed handle is the subject of the invention which is inexpensive to manufacture, is easily and securely fastened in a wall and provides an attractive appearance. The handle is made from sheet or strip material which is bent into form and the sheet material is of resilient material which provides resiliency for snap securing the handle to a wall having a recess to receive the handle. The invention relates further to a combination of the handle and a recessed wall such as the wall of a drawer, a door and the like.

It is an object of the invention to construct a recessed handle which is snap fastened into place.

Another object is to construct a recessed handle of sheet or strip material which merely requires a series of bends to shape the handle into form.

A still further object is to produce a recessed handle which uses straight line bends to shape the handle.

Other objects of the invention will be more apparent from the following description when taken in connection with the accompanying drawings which illustrate several embodiments of the invention in which:

Figure 1 is a front elevation of the handle;

Figure 2 is a cross section taken on line 2—2 of Figure 1 through the handle and a wall such as a drawer wall with the handle mounted thereon;

Figure 3 is a longitudinal section taken on line 3—3 of Figure 2;

Figure 4 is an end view of a recessed handle of modified construction;

Figure 5 is an end view of a recessed handle of another construction; and

Figure 6 is a partial enlarged view of the locking means for securing the handle in place.

The recessed handle has a U-shaped portion 10 at one end thereof, the sides of which provide an outer leg 11 and an inner leg 12. The inner leg is somewhat longer than the outer leg. A wall 13 extends rearwardly from the upper portion of the leg 12 at the end of which is a downwardly and forwardly extending portion 14. The forwardly extending portion 15 extends forwardly to or approximately to the plane of the inner face of the leg 11. These two portions form a rear wall and bottom wall preferably joined together by a curved portion 16. The leg 12 and walls 13 and 14 form a finger recess for pulling the wall which may be carried by a drawer, door or the like outwardly.

The U-shaped portion 10 has a width at least at the bottom thereof which is wider than the thickness of a wall 29 to be inserted therein. This is for easy insertion of the edge of the wall opening thereinto. Preferably means are provided for the U-shaped portion so that this end of the handle grips the wall or provides little play or looseness of the handle with respect to the wall. The means shown in Figure 2 comprises a projection 19 at each edge of the handle at the top of the leg 12. The projection 19 is formed by ears carried by the leg 12 and bent forwardly. In Figure 4 the projection is formed by an ear 20 cut out of the leg 12 and bent upwardly so that it is essentially a continuation of the wall 13. In Figure 5 the leg 12 of the U-shaped portion 10 is bent forwardly so that the upper end thereof is in the plane of or approximately in the plane of the inner surface of the wall.

Resilient locking means of any suitable form which flexes upwardly or towards the U-shaped portion when the edge of the handle is pressed inwardly is provided at the end of the wall 15 to secure or lock the handle to the wall. The locking means particularly shown is a notch between two shoulders in which one shoulder preferably is a lip or flange 23 bent downwardly from the end of the forwardly extending portion or bottom wall 15 and a locking projection 24 spaced inwardly therefrom to form a locking notch 25. At least one locking notch may be provided there being particularly shown a notch at each side edge of the recessed handle. The inward edge of the locking projection 24 may be inclined to form a wedging surface 26 the purpose of which will appear more fully hereinafter.

The recessed handle is made of resilient material or at least that part of the wall 15 which carries the locking means. With the lip or flange 23 and the locking projection 24 forming the resilient locking means the entire flange and lower end of the handle is sprung upwardly in inserting the handle. In other words the entire width of the handle provides the resiliency which locks the handle in place. The curved portion 16 serves a double function in that it extends the resilient length of the portion 15 and secondly provides clearance for the insertion of the handle into a recess. In snapping the handle into a recess in a wall the back portion or wall 14 may also provide some resiliency.

The recessed handle is assembled with a wall 29 which is particularly shown as the wall of a drawer although it may be any wall which is to be opened or moved. The wall has a rectangular hole therein to receive the recessed handle. Preferably in forming the hole in the wall, a pair of flaps 30 are formed delineated by the bottom and top of the recess and a center line 31 which flaps are bent inwardly as shown in Figure 3 to form side walls for the recess and hence close at least the visible portion of the open ends of the handle. It is desirable too that the ends of the flap 30 be bent along an inner wall 32, if one is provided, forming a flange 33 which may be secured such as by welding to the inner wall of the drawer or door. It is desirable although not necessary, that the upper edge 34 and lower edge 35 of the wall at the hole be recessed about the thickness of the handle material so that the leg 11 and the flange 23 of the handle lies flush with the wall. When the wall is provided with a recess at the top of the hole, the clamping means 19, 20 and 38 extend approximately to the plane of the inner surface of the outer leg 11.

The handle is inserted in the wall opening by tilting or cocking the lower part of the handle outwardly and inserting the wall edge 34 into the U-shaped recess. The bottom portion of the handle is then pressed inwardly and the lower edge of the wall opening engages the wedging surface 26 so that the end of the handle bends upwardly. The edge 35 of the opening then snaps into the locking notch 25. The projection 19 engages the inner face of the wall or provides very little play at this point so that the handle is securely held in place. It is clear that should it be deemed desirable the handle may be inserted in the wall opening with the finger recess at the bottom.

The handle may be molded or formed in any desired manner although preferably it is bent from resilient sheet or strip metal. The bends, in forming the handle shape, including the curved bend 15 are all straight line bends which are relatively simple and easy to form as compared to compound bends. In other words all horizontal lines in the handle are straight lines.

This invention is presented to fill a need for improvements in a recessed handle for drawers, doors and the like. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A recessed handle to be inserted in an opening in a wall comprising a U-shaped portion at one end thereof, the U-shaped portion having an outer and an inner leg, the legs being spaced a greater distance than the wall thickness received therein at least at the bottom of the U-shaped portion, means at the upper end of the U-shaped portion extending approximately to the plane of the outer leg of the U-shaped portion, the inner leg being longer than the outer leg and being of substantial length to provide contact for the ends of the fingers, a rearwardly extending wall projecting from the end of the inner leg of the U-shaped portion, and being relatively short approximating the thickness of the fingers, a downwardly and forwardly extending portion integral with the rearwardly extending wall providing a rear wall and a bottom wall extending forwardly, and locking means at the forward end of the bottom wall flexing toward the U-shaped portion upon inward movement thereof into an opening to secure the handle in a recess, the locking means being resiliently mounted for flexing towards the U-shaped portion.

2. A recessed handle to be inserted in an opening in a wall comprising a U-shaped portion at one end thereof, the U-shaped portion having an outer and an inner leg, with the inner leg projecting above the outer leg, the legs being spaced apart a greater distance than the thickness of the wall to be received therein at least at the bottom of the U-shaped portion, means at the upper end of the U-shaped portion extending approximately to the plane of the inner wall of the outer leg of the U-shaped portion, a rearwardly extending wall projecting from the end of the inner leg of the U-shaped portion, a downwardly and forwardly extending portion providing a rear wall and a bottom wall extending forwardly, at least the bottom wall being resilient, locking means at the forward end of the bottom wall being resiliently retractable to secure the handle in a recess including a downwardly extending flange carried at the forward end of the bottom wall, and a projection spaced from the flange to form a locking notch.

3. A recessed handle to be inserted in an opening in a wall comprising a U-shaped portion at one end thereof, the U-shaped portion having an outer and an inner leg with the inner leg projecting above the outer leg, the legs being spaced apart a greater distance than the thickness of the wall to be received therein at the bottom of the U-shaped portion, a projection extending outwardly from the top of the inner leg approximately to the plane of the outer leg, a rearwardly extending wall projecting from the end of the inner leg of the U-shaped portion, a downwardly and forwardly extending portion providing a rear wall and a bottom wall extending forwardly, at least the bottom wall being resilient, locking means at the forward end of the bottom wall being resiliently retractable upwardly to secure the handle in a recess including a downwardly extending flange carried at the forward end of the bottom wall, and a projection spaced from the flange to form a locking notch.

4. A recessed handle to be inserted in an opening in a wall comprising a U-shaped portion at one end thereof, the U-shaped portion having an outer and an inner leg, with the inner leg projecting above the outer leg, the legs being spaced apart a greater distance than the thickness of the wall to be received therein at the bottom of the U-shaped portion, the inner leg inclining forwardly approximately to the plane of the outer leg, a rearwardly extending wall projecting from the end of the inner leg of the U-shaped portion, a downwardly and forwardly extending portion providing a rear wall and a bottom wall extending forwardly, at least the bottom wall being resilient, locking means at the forward end of the bottom wall being resiliently retractable to secure the handle in a recess including a downwardly extending flange carried at the forward end of the bottom wall, and a projection spaced from the flange to form a locking notch.

5. A recessed handle and wall combination comprising a wall having a rectangular opening therein, flaps carried by each side edge of the opening and bent inwardly to form spaced side walls, a handle having a width corresponding to the space between the flaps and insertable in the opening in the wall including a U-shaped portion at one end thereof, the U-shaped portion having an outer leg and an inner leg, a rearwardly extending wall projecting from the end of the inner leg of the U-shaped portion and extending a distance rearwardly not exceeding the rearward extension of the flaps, a downwardly extending portion curving into a flat forwardly extending portion to the forward end thereof providing a rear wall and a smooth bottom wall extending forwardly, a flange extending downwardly from the outer edge of the bottom wall, and locking means at the forward end of the bottom wall flexing upwardly to secure the bottom of the handle in a recess, the locking means being resiliently mounted for flexing towards the U-shaped portion.

6. A recessed handle and wall combination as in claim 5 including a recess in the wall at the upper and lower edges of the opening having a depth approximately the same as the thickness of the leg and flange.

References Cited in the file of this patent

UNITED STATES PATENTS

| | | |
|---|---|---|
| 747,167 | Hahn | Dec. 15, 1903 |
| 1,304,700 | Otte | May 27, 1919 |
| 1,976,118 | Cruikshank | Oct. 9, 1934 |
| 2,055,688 | Halinka | Sept. 29, 1936 |
| 2,311,645 | Dempsey | Feb. 23, 1943 |
| 2,341,093 | Haberstump | Feb. 18, 1944 |

FOREIGN PATENTS

| | | |
|---|---|---|
| 11,450 | Great Britain | July 16, 1914 |